United States Patent
Herd et al.

Patent Number: 5,132,410
Date of Patent: Jul. 21, 1992

[54] AZO REACTIVE DYESTUFFS CONTAINING A FLUOROTRIAZINYL GROUP

[75] Inventors: Karl-Josef Herd, Odenthal-Holz; Manfred Hoppe, Kuerten; Hermann Henk, Cologne; Frank-Michael Stöhr, Odenthal-Osenau, all of Fed. Rep. of Germany

[73] Assignee: Bayer Aktiengesellschaft, Leverkusen, Fed. Rep. of Germany

[21] Appl. No.: 606,412

[22] Filed: Oct. 31, 1990

[30] Foreign Application Priority Data

Dec. 6, 1989 [DE] Fed. Rep. of Germany ........ 3940268

[51] Int. Cl.$^5$ ..................... C09B 62/085; D06P 1/382
[52] U.S. Cl. ................................. 534/635; 534/632; 8/549
[58] Field of Search .............................. 534/635; 8/549

[56] References Cited

FOREIGN PATENT DOCUMENTS 0230210 7/1987 European Pat. Off. .
0299315 1/1989 European Pat. Off. .
2033279 1/1972 Fed. Rep. of Germany ...... 534/635
2039324 4/1980 United Kingdom .

*Primary Examiner*—Mary C. Lee
*Assistant Examiner*—Fiona T. Powers
*Attorney, Agent, or Firm*—Sprung Horn Kramer & Woods

[57] ABSTRACT

Dyestuffs of the formula

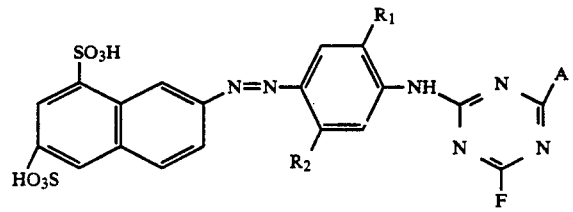

having the substituent meanings given in the description, are suitable for dyeing and printing materials containing hydroxyl groups and carboxamide groups.

4 Claims, No Drawings

AZO REACTIVE DYESTUFFS CONTAINING A FLUOROTRIAZINYL GROUP

The invention relates to azo reactive dyestuffs of the formula

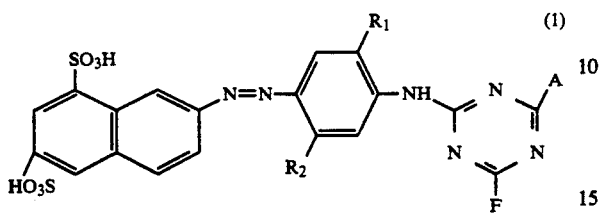

wherein
$R_1$ = H, optionally substituted $C_1$-$C_4$-alkyl or optionally substituted $C_1$-$C_4$-alkoxy,
$R_2$ = Cl, optionally substituted $C_1$-$C_4$-alkyl, optionally substituted $C_1$-$C_4$-alkoxy or acylamino and
A =

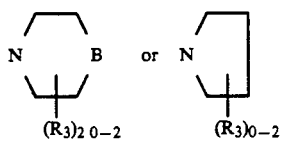

wherein
$R_3$ = $C_1$-$C_4$-alkyl or $C_1$-$C_4$-alkoxy and
B = $CH_2$, S, SO, $SO_2$, O or N—$R_4$, where
$R_4$ = H or optionally substituted $C_1$-$C_6$-alkyl.
Suitable substituents for $R_4$ are, in particular, OH, $OSO_3H$, $SO_3H$ and COOH.

Examples of suitable acylamino radicals are $C_1$-$C_4$-alkylcarbonylamino, $C_1$-$C_4$-alkylsulphonylamino, phenylsulphonylamino, phenylcarbonylamino, phenyl-$C_1$-$C_4$-alkylcarbonylamino and —$NHCONH_2$, it being possible for the alkyl and phenyl radicals to carry the customary substituents.

Preferred dyestuffs are those of the formula

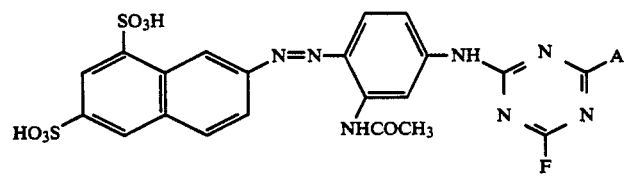

wherein
A has the abovementioned meaning.
Particularly preferred dyestuffs are those of the formula

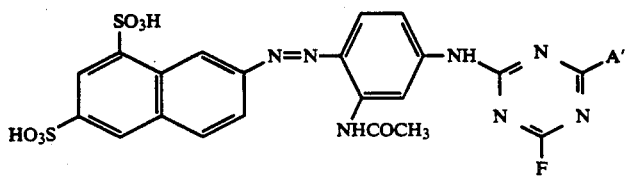

wherein
A' =

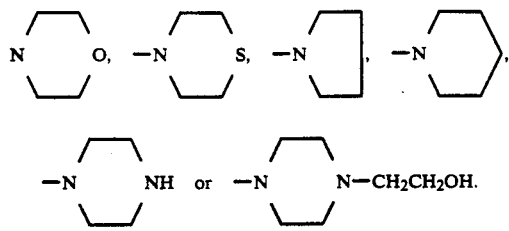

The preferred method of preparation of the reactive dyestuffs (1) is characterized in that 7-amino-1,3-naphthalenedisulphonic acid is diazotized, the diazotization product is coupled to aniline derivatives of the formula

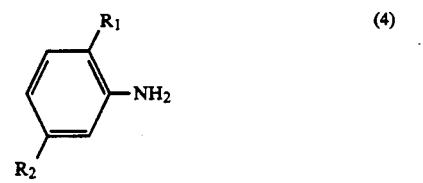

and the resulting colour bases of the formula

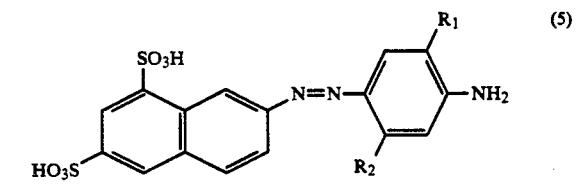

are subjected to a condensation reaction with 2,4,6-trifluoro-s-triazine and an amine HA in succession, HF being split off.

The new dyestuffs are suitable for dyeing and printing materials containing hydroxyl and amide groups, in particular cellulose materials. They are distinguished by a high reactivity and a high degree of fixing. The dyeings or prints obtainable with these dyestuffs on cellulose materials are moreover distinguished by a high fibre-dyestuff bond stability and by an outstanding stability towards oxidizing agents, such as detergents containing peroxide or chlorine. The ease of washing out of the hydrolysis products formed to only a minor degree during dyeing or printing is excellent. The dyestuffs have good wet-fastness properties.

The formulae shown are those of the free acids. The salts, in particular the alkali metal salts, such as sodium salts, potassium salts or lithium salts, are in general obtained during the preparation.

The dyestuffs can be employed either as solid formulations or as concentrated solutions.

EXAMPLE 1

23.6 g of the monosodium salt of 7-amino-1,3-naphthalenedisulphonic acid are stirred into 150 ml of water/30 g of ice and 20 ml of concentrated hydrochloric acid, and 17 ml of an aqueous sodium nitrite solution (300 g of $NaNO_2/l$) are added dropwise at 5°-10° C. After the mixture has been stirred at 5°-10° C. for one hour, the excess nitrous acid is removed with amidosulphonic acid.

This cream-coloured suspension is now metered into a neutral solution of the coupling component, which has been prepared from 13.5 g of N-(3-aminophenyl-)acetamidehydrochloride, 50 ml of water, 50 g of ice and about 30 ml of 10% strength aqueous lithium hydroxide solution, in the course of 30 minutes. During this procedure, the pH of the reaction mixture is kept constant at 6.0–6.5 with 20% strength aqueous potassium bicarbonate solution. If possible, the temperature should not exceed 10° C. When the addition is completed, the mixture is subsequently stirred for 30 minutes, during which the pH is still kept constant.

The red-brown coupling solution is cooled to 0° C. with ice and about 11 g of trifluoro-s-triazine are added. The pH is kept constant at between 6.0 and 6.2 by metering in potassium bicarbonate solution or sodium carbonate solution. The condensation reaction has ended after 5–10 minutes. A solution of 13.4 g of morpholine hydrogen sulphate in 50 ml of water is added, the pH is kept constant at 7.5–8.0 with sodium carbonate solution and the reaction temperature is allowed to rise slowly to 25° C. The second condensation reaction is subsequently stirred for about 1 hour, until the pH no longer changes towards lower values. 30 g of sodium chloride and 30 g of potassium chloride are added, the mixture is stirred for a further hour and the dyestuff which has precipitated is isolated by filtration with suction. After drying at 60° C. in vacuo, 55 g of a salt-containing orange-red dyestuff powder of the formula

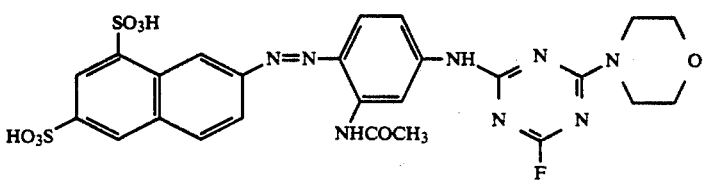

($\lambda_{max}=396$, 460 (sh) nm ($H_2O$)), which dyes cotton in brilliant golden yellow shades of high fastness, are obtained.

By varying the amine HA, further useful golden yellow reactive dyestuffs of the formula

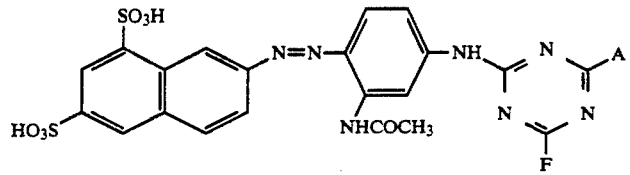

are accessible analogously to Example 1:

| Example | A | $\lambda_{max}$ ($H_2O$) |
|---|---|---|
| 2 | —N⟨pyrrolidine⟩ | 402,470 (sh) nm |
| 3 | —N⟨piperidine⟩ | 398,470 (sh) nm |
| 4 | —N⟨piperazine⟩NCH$_2$CH$_2$OH | 398,480 (sh) nm |
| 5 | —N⟨piperazine⟩NH | 398,470 (sh) nm |

We claim:
1. An azo reactive dyestuff of the formula

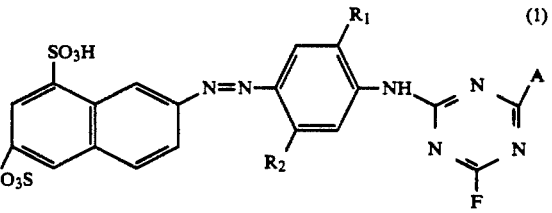

wherein
$R_1$=H, $C_1$-$C_4$-alkyl or $C_1$-$C_4$-alkoxy,
$R_2$=Cl, $C_1$-$C_4$-alkyl, $C_1$-$C_4$-alkoxy or acylamino and
A=

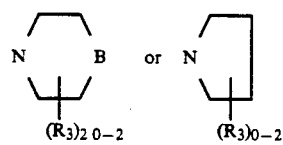
wherein
$R_3 = C_1-C_4$-alkyl or $C_1-C_4$-alkoxy and
$B = CH_2$, S, SO, $SO_2$, O or $N-R_4$, where
$R_4 = H$ or $C_1-C_6$-alkyl
2. A dyestuff according to claim 1, of the formula
(2)
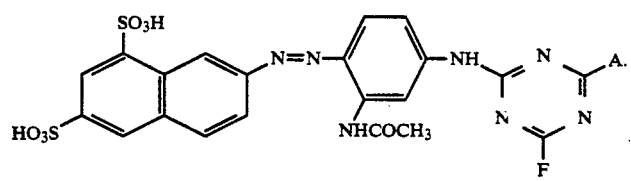
3. A dyestuff of claim 1, of the formula
(3)
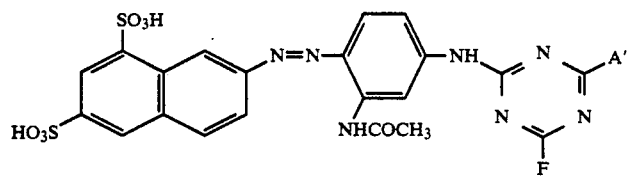
wherein
$A' =$
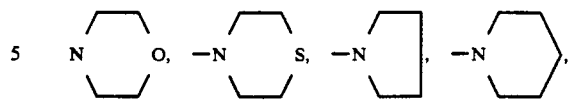
4. A method for dyeing or printing materials containing hydroxyl groups and carboxamide groups comprising applying a dyestuff according to claim 1.
* * * * *

UNITED STATES PATENT AND TRADEMARK OFFICE
CERTIFICATE OF CORRECTION

PATENT NO. : 5,132,410

DATED : July 21, 1992

INVENTOR(S) : Herd et al.

It is certified that error appears in the above-identified patent and that said Letters Patent is hereby corrected as shown below:

Col. 2, line 2, item [56],
Title Page      FOREIGN PATENT DOCUMENTS: Delete " 2039324 " and substitute -- 2031932 --

Col. 5, line 7    Delete " 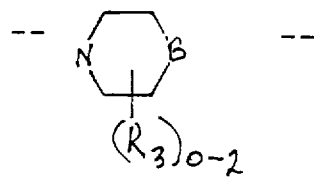 " and substitute

Signed and Sealed this

Twenty-eighth Day of June, 1994

Attest:

BRUCE LEHMAN

Attesting Officer      Commissioner of Patents and Trademarks